(12) United States Patent
Akahoshi et al.

(10) Patent No.: US 8,285,443 B2
(45) Date of Patent: Oct. 9, 2012

(54) CONTROLLER FOR VEHICLE

(75) Inventors: Nobuyuki Akahoshi, Wako (JP); Kazuhito Aizawa, Wako (JP); Kanao Kogure, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 789 days.

(21) Appl. No.: 12/328,189

(22) Filed: Dec. 4, 2008

(65) Prior Publication Data
US 2009/0150025 A1    Jun. 11, 2009

(30) Foreign Application Priority Data
Dec. 10, 2007  (JP) ................................. 2007-318768

(51) Int. Cl.
G06F 7/00 (2006.01)
(52) U.S. Cl. ....... 701/36; 62/176.2; 236/44 R; 236/44 C
(58) Field of Classification Search .................... 701/36; 62/176.2, 244; 236/44 R, 44 A, 44 B, 44 C
See application file for complete search history.

(56) References Cited

U.S. PATENT DOCUMENTS

| 6,073,456 | A * | 6/2000 | Kawai et al. ...................... 62/133 |
| 6,073,689 | A * | 6/2000 | Mizuno ........................... 165/201 |
| 6,148,632 | A * | 11/2000 | Kishita et al. .................. 62/323.1 |
| 6,311,505 | B1 * | 11/2001 | Takano et al. .................... 62/159 |
| 6,515,448 | B2 * | 2/2003 | Iritani et al. ................... 320/104 |
| 6,530,426 | B1 * | 3/2003 | Kishita et al. .................. 165/202 |
| 6,626,001 | B2 * | 9/2003 | Hamachi et al. ............. 62/228.1 |
| 6,637,230 | B2 * | 10/2003 | Iwanami et al. ................ 62/244 |
| 6,662,579 | B2 * | 12/2003 | Takano et al. .................... 62/186 |
| 6,751,968 | B2 * | 6/2004 | Takano ........................... 62/159 |
| 6,755,033 | B2 * | 6/2004 | Iwanami et al. ................ 62/133 |
| 7,958,740 | B2 * | 6/2011 | Hirai et al. ...................... 62/150 |
| 2001/0010261 | A1 * | 8/2001 | Oomura et al. ................ 165/42 |

(Continued)

FOREIGN PATENT DOCUMENTS
JP       04-358729 A       12/1992
(Continued)

OTHER PUBLICATIONS

Japanese Office Action dated Nov. 27, 2009, issued in corresponding Japanese Patent Application No. 2007-318768.

*Primary Examiner* — Khoi Tran
*Assistant Examiner* — Jamie Figueroa
(74) *Attorney, Agent, or Firm* — Westerman, Hattori, Daniels & Adrian, LLP

(57)     ABSTRACT

A controller for a vehicle makes it possible to prevent window glass from fogging and also to reduce fuel consumption in conducting control to temporarily stop an engine when a vehicle stops. The controller for a vehicle includes a vehicle condition detector which detects a condition under which a vehicle is being placed, a fogging determination humidity estimator which estimates a fogging determination humidity, which is a humidity not causing window glass of the vehicle to fog up under the condition detected by the vehicle condition detector, a humidity detector which detects the humidity in the vehicle, and an engine stop duration determiner which determines a longer engine stop duration as the humidity difference increases between the humidity detected by the humidity detector immediately before an engine is stopped and the fogging determination humidity. An engine control unit restarts the engine and also starts up a refrigeration cycle unit and a blower fan when an engine stop duration has elapsed following an engine stop.

4 Claims, 3 Drawing Sheets

U.S. PATENT DOCUMENTS

| | | | |
|---|---|---|---|
| 2002/0053212 A1* | 5/2002 | Iwanami et al. | 62/133 |
| 2002/0084769 A1* | 7/2002 | Iritani et al. | 320/104 |
| 2002/0104324 A1* | 8/2002 | Homan et al. | 62/176.2 |
| 2002/0157412 A1* | 10/2002 | Iwanami et al. | 62/236 |
| 2003/0041603 A1* | 3/2003 | Tada et al. | 62/134 |
| 2003/0068232 A1* | 4/2003 | Iwanami et al. | 417/212 |
| 2003/0101740 A1* | 6/2003 | Suzuki et al. | 62/230 |
| 2003/0118450 A1* | 6/2003 | Iwanami et al. | 417/15 |
| 2003/0133809 A1* | 7/2003 | Iwanami | 417/212 |
| 2003/0200759 A1* | 10/2003 | Iwanami et al. | 62/133 |
| 2003/0200760 A1* | 10/2003 | Iwanami et al. | 62/133 |
| 2003/0209022 A1* | 11/2003 | Ieda et al. | 62/244 |
| 2005/0109499 A1* | 5/2005 | Iwanami et al. | 165/202 |

FOREIGN PATENT DOCUMENTS

| | | |
|---|---|---|
| JP | 2002-213270 A | 7/2002 |
| JP | 2005-23845 A | 1/2005 |
| JP | 2005-171918 A | 6/2005 |

* cited by examiner

CONTROLLER FOR VEHICLE

BACKGROUND OF THE INVENTION

1. Field of the Invention

The present invention relates to a controller for a vehicle which stops an engine mounted in a vehicle when a stop condition holds while the engine is in operation, and restarts the engine when a start condition holds while the engine is at rest.

2. Description of the Related Art

Hitherto, there has been known a controller for a vehicle adapted to temporarily stop an engine while a vehicle is at rest thereby to restrain fuel consumption from idling while the vehicle is at rest (refer to, for example, Japanese Patent Application Laid-Open No. H4-358729).

In a conventional controller for a vehicle, an engine is stopped when the vehicle speed reaches zero and the vehicle stops and the clutch switch turns off (i.e., when a stop condition holds), and the engine is restarted when a predetermined time has elapsed following the engine stop (i.e., when a start condition holds).

Further, in the conventional controller for a vehicle, the predetermined time, which is related to the engine start condition, has been set at a fixed time.

Here, if the time from the stop to the restart of the engine is fixed, as with the conventional controller for a vehicle, there are cases where the window glass of the vehicle undesirably fogs up due to a rise in humidity in the vehicle by the time the engine is restarted, depending on the outside air or the condition in the vehicle when the vehicle stops and the engine stops after the interior of the vehicle has been naturally ventilated by the travel of the vehicle or if a dehumidifier has been operated from the driving force of the engine until the engine stops and the operation of the dehumidifier stops as the engine stops. The fogging up of the window glass inconveniently forces the driver to defog the window glass when he/she restarts the vehicle.

On the other hand, if the time from the stop to the restart of the engine is set to be shorter so as to prevent the window glass from fogging up, then the effect for restraining fuel consumption by stopping the engine while the vehicle is at rest would be inconveniently inadequate.

SUMMARY OF THE INVENTION

An object of the present invention is to provide a controller for a vehicle capable of reducing fuel consumption of a vehicle while restraining window glass from fogging up at the same time when carrying out control to temporarily stop an engine while the vehicle is at rest.

The present invention has been made to fulfill the aforesaid object and the invention relates to an improvement of a controller for a vehicle equipped with an engine and a dehumidifier operated from a driving force of the engine to dehumidify the interior of the vehicle. The controller for a vehicle is equipped with an engine controller which stops the engine when a predetermined stop condition holds, and thereafter restarts the engine when a predetermined engine stop duration has elapsed.

The controller for a vehicle further includes a vehicle condition detector which detects a condition under which the vehicle is placed, a fogging determination humidity estimator which estimates a fogging determination humidity, which is a humidity not causing window glass of the vehicle to fog up under the condition detected by the vehicle condition detector, a humidity detector which detects the humidity in the interior of the vehicle, and an engine stop duration determiner which determines the engine stop duration on the basis of the humidity difference between the humidity detected by the humidity detector immediately before the engine is stopped and the fogging determination humidity and determines a longer engine stop duration as the humidity difference increases, wherein the engine controller restarts the engine and actuates the dehumidifier when the engine stop duration has elapsed following the predetermined stop condition being established and the engine stopped.

With this arrangement, the fogging determination humidity estimator estimates the fogging determination humidity, which is a humidity not causing window glass to fog up under the condition detected by the vehicle condition detector. Then, the engine stop duration determiner determines a longer engine stop duration as the humidity difference increases between the humidity detected by the humidity detector immediately before the engine is stopped and the fogging determination humidity.

Thus, the engine stop duration can be determined by reflecting the likelihood of fogging up of window glass of the vehicle by determining on the longer engine stop duration as the humidity difference increases between the fogging determination humidity estimated according to the condition under which the vehicle is placed and the humidity detected by the humidity detector immediately before the engine is stopped. With this arrangement, the engine is restarted and the dehumidifier is actuated by the engine controller when the engine stop duration has elapsed following the engine stop, thus making it possible to restrain fuel consumption by maximizing the duration in which the engine is stopped within a range which does not cause the window glass of the vehicle to fog up.

In the present invention, immediately before the engine is stopped, there is an extremely small (ignorable) difference between the humidity detected by the humidity detector immediately before the engine was stopped and the humidity detected by the humidity detector at the point when the engine was stopped. When the engine is stopped, the humidity in a vehicle suddenly changes, so that it is difficult to stably detect the humidity in the vehicle by the humidity detector. However, using the humidity detected immediately before the engine is stopped makes it possible to stably detect or estimate the humidity in the vehicle when the engine is stopped, allowing the engine stop duration to be determined.

Further, the vehicle is equipped with a blower fan which supplies air from outside into the vehicle or circulates air in the vehicle, and the engine stop duration determiner determines a longer engine stop duration in the case where the blower fan is operating while the engine is at rest than in the case where the blower fan is not operating while the engine is at rest.

With this arrangement, when the blower fan is operating while the engine is at rest, the convection of air in the vehicle reduces the possibility of the fogging of the window glass. This makes it possible to determine a longer engine stop duration than when the blower fan is not operating while the engine is at rest, thus allowing fuel consumption of the engine to be restrained.

Further, the dehumidifier has a refrigerant circulation passage, a compressor which is connected to the refrigerant circulation passage and driven by the engine, and an evaporator which is connected to the refrigerant circulation passage and which is provided in a circulation passage of air blown into the vehicle by the flower fan, and which dehumidifies the interior of the vehicle by operating the compressor and the blower fan. The engine stop duration determiner determines a longer engine stop duration in a case where the dehumidifier is dehumidifying the interior of the vehicle at the time the engine stops and the blower fan is in operation while the engine is at rest than in a case where the dehumidifier is not dehumidifying the interior of the vehicle at the time the engine stops and the blower fan is in operation while the engine is at rest.

In this arrangement, when the engine is running and the compressor is being driven, the evaporator is cold by having been cooled by a refrigerant. Further, even when the engine stops and the compressor stops, the air blown into the vehicle through the intermediary of the evaporator is dehumidified until the temperature of the evaporator rises to a certain level as long as the blower fan is operating. This makes it possible to determine a longer engine stop duration than when the dehumidifying in the vehicle by the dehumidifier is at a halt when the engine stops and the blower fan is operating while the engine is at rest. This arrangement permits restrained fuel consumption of the engine.

The controller for a vehicle further includes an outside air temperature detector which detects the temperature outside the vehicle, wherein the vehicle condition detector detects a condition under which the vehicle is placed on the basis of at least the temperature detected by the outside air temperature detector.

If the temperature outside the vehicle is low, the temperature of the window glass becomes low, leading to an increased difference between the outside temperature and the temperature inside the vehicle, frequently causing the window glass to fog up. The vehicle condition detector in the present invention is capable of detecting the condition of the vehicle which influences the likelihood of the fogging of the window glass on the basis of the temperature detected by the outside air temperature detector.

DESCRIPTION OF THE PREFERRED EMBODIMENTS

Figure 1:
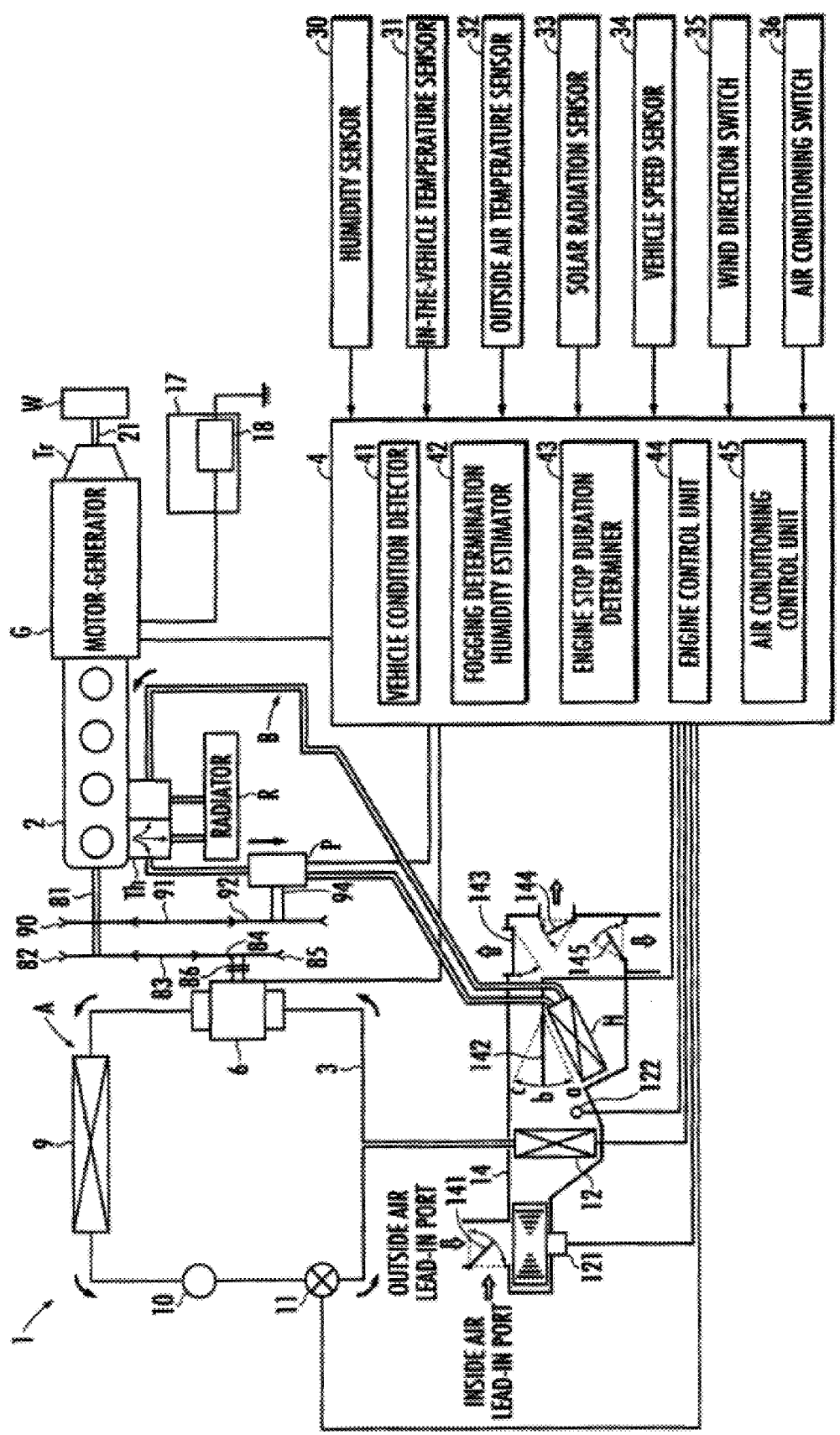
FIG. 1 is a block diagram illustrating a vehicle provided with the controller for a vehicle in accordance with the present invention.
Figure 2:
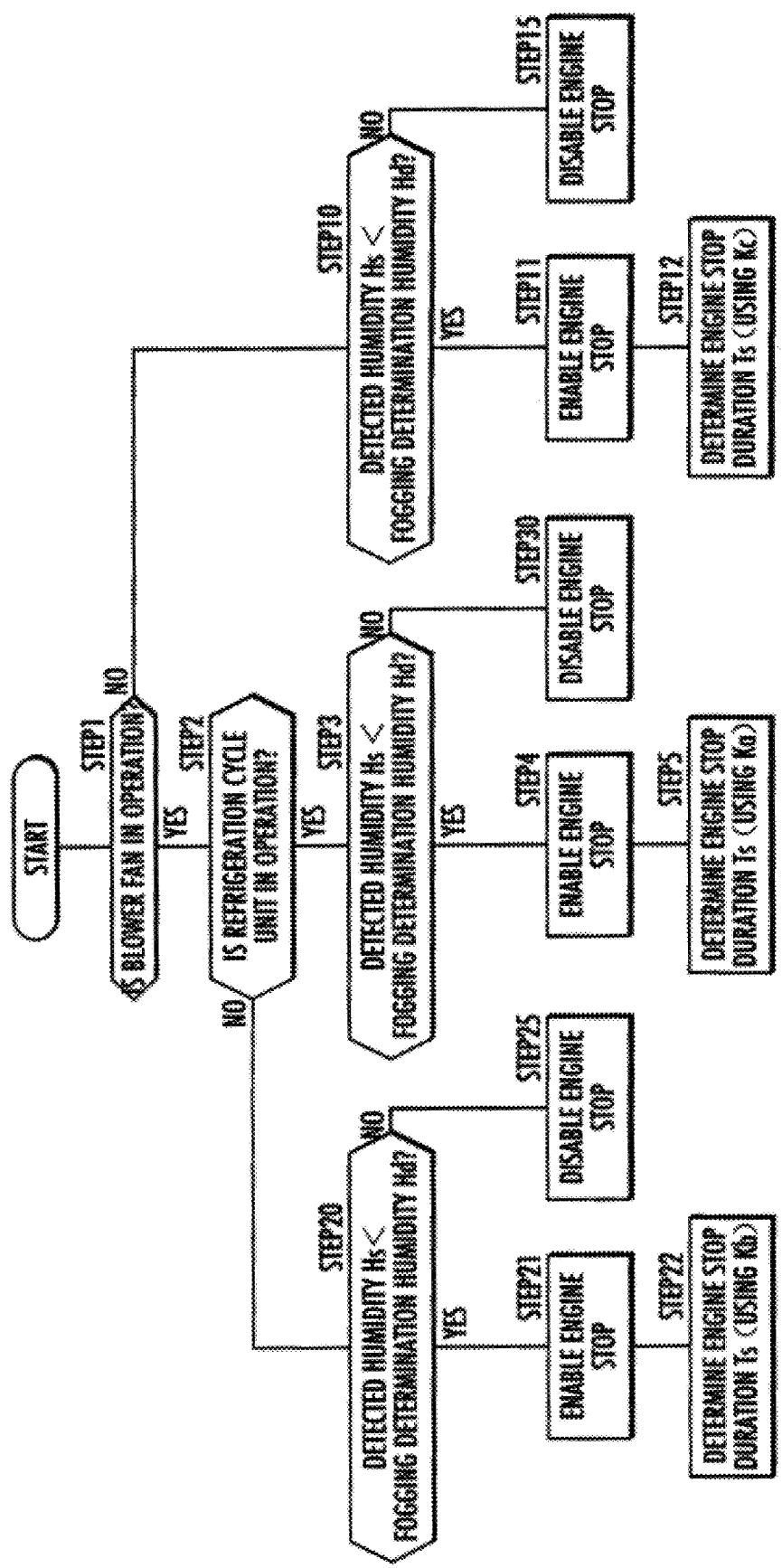
FIG. 2 is a flowchart of determining enable and disable of an engine stop on the basis of the humidity in a vehicle.
Figure 3:
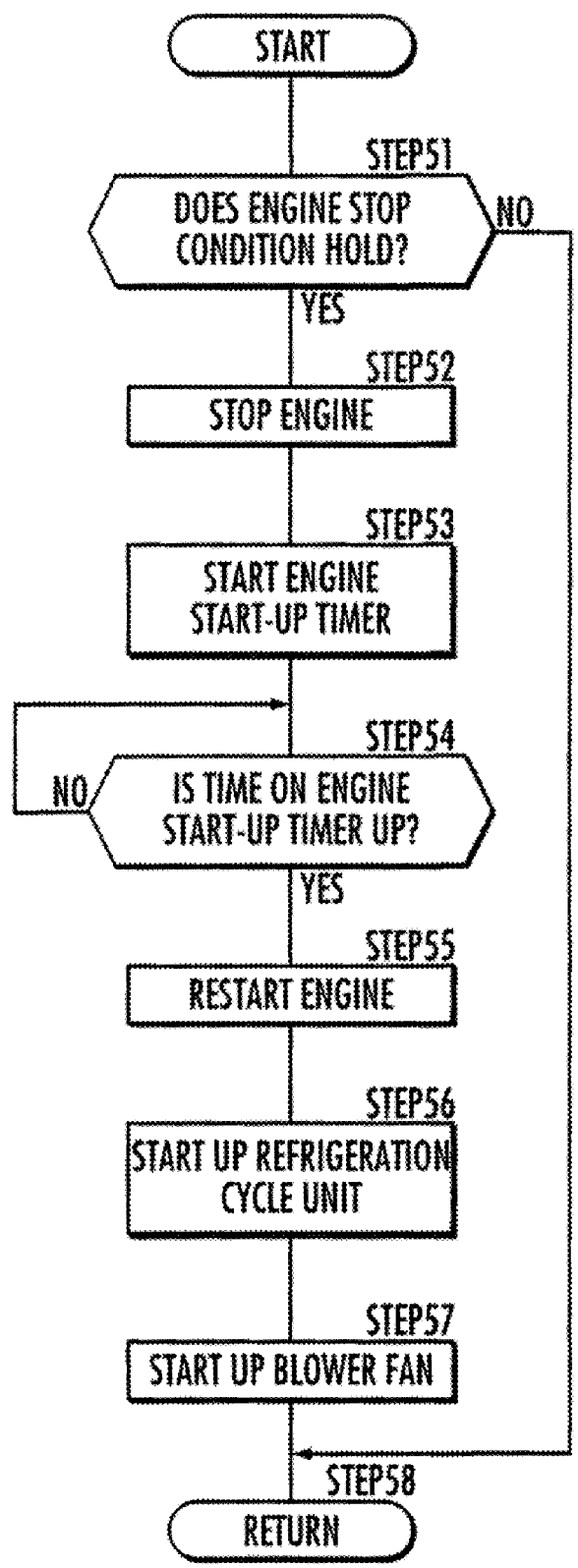
FIG. 3 is a flowchart for temporarily stopping an engine while preventing window glass from fogging up.

The following will describe an embodiment of the present invention with reference to FIG. 1 to FIG. 3.

FIG. 1 is a block diagram of a vehicle equipped with the controller for a vehicle in accordance with the present invention. The vehicle of the present embodiment is a hybrid vehicle having an engine 2 and a motor-generator G as the drive sources thereof. The vehicle of the present embodiment is further equipped with an engine stop/restart feature for stopping the engine 2 if a stop condition holds and for restarting the engine 2 if a start condition holds thereby to reduce the amount of emission gases and to restrain fuel consumption when the vehicle stops at a traffic signal or in a traffic jam or the like.

The vehicle of the present embodiment is further equipped with an air conditioner 1 which heats/cools the interior of the vehicle. The air conditioner 1 has a cooling function and a dehumidifying function performed by a refrigeration cycle unit A, which includes the function of the dehumidifier in the present invention, and a heating function by a heater core H provided in a circulation passage B of a coolant of the engine 2.

A controller 4, which is an electronic unit constructed mainly of a microcomputer (corresponding to the controller for a vehicle in the present invention), controls the operations of the engine 2, the motor-generator G, and the air conditioner 1. The controller 4 functions as a vehicle condition detector 41, a fogging determination humidity estimator 42, an engine stop duration determiner 43, an engine control unit 44, and an air conditioning control unit 45 by running a predetermined program.

The controller 4 receives detection signals from a humidity sensor 30 (corresponding to the humidity detecting means in the present invention) which detects the humidity in a vehicle, an inside-the-vehicle temperature sensor 31 which detects the temperature in a vehicle, an outside air temperature sensor 32 (corresponding to the outside air temperature detecting means in the present invention) which detects the temperature outside the vehicle, a solar radiation sensor 33 which detects the amount of solar radiation, a vehicle speed sensor 34 which detects a vehicle speed, and an evaporator temperature sensor 122 which detects the temperature in the vicinity of the downstream side of the evaporator 12, which will be discussed later. The controller 4 also receives operational signals of a wind direction switch 35 which sets the direction of air into the vehicle, and an air conditioning switch 36 which sets the conditions of air conditioning, such as a temperature and an air volume.

The controller 4 issues control signals to control the operations of the engine 2, the motor-generator G, the air conditioner 1, and the like.

The air conditioner 1 is provided with a compressor 6 driven by the engine 2, a condenser 9, a receiver 10, an expansion valve 11, and the evaporator 12, which constitute a refrigeration cycle unit A. The air conditioner 1 is also provided with a heater core H constituting a coolant circulation passage B of the engine 2, a water pump P driven by the engine 2, a thermostat Th, and a radiator R to perform heating.

The engine 2 and the motor-generator G are directly connected by a rotating shaft 21, thus making possible to generate a driving force by the engine 2 and the motor-generator G and to generate a regenerative electric power by the motor-generator G at the time of deceleration. The revolutions of the engine 2 and the motor-generator G are transmitted to wheels W through the intermediary of a transmission Tr.

Further, the motor-generator G has a function as a starter motor for starting up the engine 2. The regenerative electric power of the motor-generator G charges a battery 18 (corresponding to the electric storage means in the present invention) of an electrical storage unit 17.

The refrigeration cycle unit A is constructed by connecting the compressor 6, the condenser 9, the receiver 10, the expansion valve 11, and the evaporator 12 in this order to a refrigerant circulation passage 3, the compressor 6 being located on the upstream side, while the evaporator 12 being located on the downstream side. The refrigeration cycle evaporates, compresses, condenses, and expands a refrigerant composed of chlorofluorocarbon or carbon dioxide or the like.

The air conditioning control unit 45 of the controller 4 calculates a target evaporator temperature on the basis of mainly the temperature set by means of the air conditioning switch 36, an outside air temperature, humidity, and the amount of solar radiation, and controls the compressor 6 such that the difference between the target evaporator temperature and the temperature detected by the evaporator temperature sensor 122 is reduced. The compressor 6 is operated by the driving force of the engine 2. The driving force of the engine is transmitted to the compressor 6 through the intermediary of a pulley 82 provided on the distal end of a rotating shaft 81 of the engine 2, a pulley 85 provided on a drive shaft 84 of the compressor 6 and a belt 83 which interlocks the pulleys 82 and 85.

The drive shaft 84 of the compressor 6 is provided with an electromagnetic clutch 86, and the air conditioning control unit 45 switches between the transmission and the cutoff of the driving force of the engine 2 to the compressor 6 by the electromagnetic clutch 86.

The condenser 9 cools and liquefies, by heat exchange, a refrigerant which has come to carry high temperature and high pressure by having been compressed by the compressor 6. The receiver 10, which is a cylinder for temporarily storing the refrigerant liquefied by the condenser 9, is connected to the expansion valve 11 through the intermediary of a drier (not shown). The refrigerant whose moisture has been removed by the drier is supplied to the expansion valve 11.

When the liquefied refrigerant having high temperature and high pressure passes through the expansion valve 11, which is installed at the inlet side of the evaporator 12, the expansion valve 11 changes the refrigerant from the liquefied state into a misty gas and then injects the misty gas. The expansion valve 11 incorporates a throttle valve (not shown). The air conditioning control unit 45 controls the opening of the throttle valve thereby to adjust the flow rate of the refrigerant (the refrigerant capacity) to be injected into the evaporator 12.

The evaporator 12 is a heat exchanger which takes heat from the air inside the vehicle by vaporizing the refrigerant thereby to cool the interior of the vehicle. The evaporator 12 is accommodated in an air conditioning case 14. A blower fan 121 is provided on the upstream side of the evaporator 12. The number of revolutions of the blower fan 121 is controlled by the air conditioning control unit 45. As the blower fan 121 rotates, the air which has been dehumidified and cooled by the evaporator 12 or the air which has been heated by the heater core H is blown into the vehicle, and the air in the vehicle or outside air is sucked into the air conditioning case 14. The air is sent out into the vehicle through the intermediary of a deaf door 143, vent door 144, and a floor door 145.

The construction of the heating system will now be described. The coolant of the engine 2 is supplied from the thermostat Th to the radiator R by the mechanical water pump P operated by the driving force of the engine 2, and the coolant circulates in a water jacket of the engine 2. Further, the coolant of the engine 2 is branched to be used as a heating source for heating the interior of the vehicle. The coolant circulates in the circulation passage B from the water pump P via the heater core H and back to the water pump P.

The driving force of the engine 2 is transmitted to the water pump P through the intermediary of a pulley 90 provided on the rotating shaft 81 of the engine 2, a pulley 92 provided on a drive shaft 94 of the water pump P, and a belt 91 which interlocks the pulleys 90 and 92.

The heater core H is adapted to perform heat exchange for heating surrounding air by the heat from the coolant which has been heated by the engine 2 in the radiator R. On the upstream side of the heater core H, an air mixing door 142 is installed. The air mixing door 142 leads the air which has passed through the evaporator 12 to the heater core H or makes the air bypass the heater core H.

The air mixing door 142 is formed of, for example, a rotary plate door which opens and closes the air inlet of the heater core H. The air mixing door 142 is opened and closed by an air mixing servomotor (not shown) installed adjacently to the rotational center. When the air mixing door 142 is in a closed position "a," the air in the air conditioning case 14 is prevented from flowing to the heater core H.

Further, the positions of the air mixing door 142 are set such that half of the air in the air conditioning case 14 flows to the heater core H at a middle position "b" and all the air in the air conditioning case 14 flows to the heater core H at a release position "c." The air conditioning control unit 45 operates the air mixing servomotor (not shown) to change the position of the air mixing door 142, thereby controlling the temperature of the air to be blown into the vehicle.

In the air conditioning case 14, an intake door 141 which switches between an inside air lead-in port and an outside air lead-in port is installed on the upstream side, and the deaf door 143 for discharging the air which has been dehumidified and cooled by the evaporator 12 or the air which has been heated by the heater core H to a defroster, the vent door 144 for discharging the air to a ventilator, and the floor door 145 for discharging the air to feet are installed on the downstream side. The intake door 141, the deaf door 143, the vent door 144, and the floor door 145 may be electrically moved by servomotors or moved manually.

Referring now to the flowcharts given in FIG. 2 and FIG. 3, the processing for stopping/restarting the engine 2 by the engine control unit 44 will be described.

The engine control unit 44 repeatedly runs the processing illustrated by the flowchart given in FIG. 2 to determine whether to enable or disable the stopping of the engine 2 while the engine 2 is in operation. First, in STEP1, the engine control unit 44 determines whether the blower fan 121 is in operation. The engine control unit 44 proceeds to STEP2 if the blower fan 121 is in operation, or branches off to STEP10 if the blower fan 121 is at rest.

In STEP2, the engine control unit 44 determines whether the refrigeration cycle unit A is in operation. Then, the engine control unit 44 proceeds to STEP3 if the refrigeration cycle unit A is in operation or branches off to STEP20 if the refrigeration cycle unit A is at rest.

In STEP3, the engine control unit 44 determines whether a humidity Hs in the vehicle detected by the humidity sensor 30 is lower than the fogging determination humidity Hd estimated by the fogging determination humidity estimator 42. If the detected humidity Hs is lower than the fogging determination humidity Hd, then the engine control unit 44 proceeds to STEP4 wherein it enables the stopping of the engine 2. Meanwhile, if the detected humidity Hs is the fogging determination humidity Hd or higher, then the engine control unit 44 branches off to STEP30 wherein it disables the stopping of the engine 2.

Here, the vehicle condition detector 41 detects the condition under which the vehicle is being placed primarily on the basis of the temperature in the vehicle detected by the in-the-vehicle temperature sensor 31, the outside air temperature detected by the outside air temperature sensor 32, the amount of solar radiation detected by the solar radiation sensor 33, the vehicle speed immediately before the vehicle stops detected by the vehicle speed sensor 34, the direction of air blown into the vehicle by the blower fan 121 set by the wind direction switch 35, and the air conditioning condition set by the air conditioning switch 36.

The vehicle condition detector 41 does not necessarily have to detect the condition under which the vehicle is being placed on the basis of all the above factors. Instead, the detection may be performed on the basis of, for example, only the outside air temperature. Further alternatively, the condition under which the vehicle is being placed may be detected by adding more factors, such as the opening degrees of the windows of the vehicle.

Then, the fogging determination humidity estimator 42 estimates, as the fogging determination humidity Hd, the humidity at which the window glass of the vehicle does not fog up in the condition under which the vehicle is being placed. The fogging determination humidity estimator 42 estimates the fogging determination humidity Hd by referring to a map, which indicates the correlation between the conditions, under which the vehicle is placed, detected by the vehicle condition detector 41 and the fogging determination humidity Hd. The map is prepared by experiments, computer simulation, or the like, and the data of the map is stored beforehand in a memory (not shown). Instead of using a map, an expression of the correlation between the conditions under which the vehicle is placed and the fogging determination humidity Hd may be used to estimate the fogging determination humidity Hd.

If the engine control unit 44 enables the stopping of the engine 2 in STEP4, then the processing proceeds to STEP5 wherein the engine stop duration determiner 43 determines an engine stop duration Ts according to expression (1) given below.

$$Ts=1/Ka \cdot (Hd-Hs) \qquad (1)$$

where Ts: Engine stop duration; Ka: Humidity rise coefficient applied if the refrigeration cycle unit A and the blower fan 121 are in operation when the engine 2 is stopped and the operation of the blower fan 121 is continued after the engine 2 is stopped; Hd: Fogging determination humidity; and Hs: Humidity detected immediately before the engine is stopped.

In STEP10, the engine control unit 44 determines whether the humidity Hs detected in the vehicle by the humidity sensor 30 is lower than the fogging determination humidity Hd estimated by the fogging determination humidity estimator 42. If the detected humidity Hs is lower than the fogging determination humidity Hd, then the engine control unit 44 proceeds to STEP11 to enable the stopping of the engine 2. Meanwhile, if the detected humidity Hs is the fogging determination humidity Hd or more, then the engine control unit 44 branches off to STEP15 to disable the stopping of the engine 2.

If the engine control unit 44 enables the stopping of the engine 2 in STEP11, then the processing proceeds to STEP12 wherein the engine stop duration determiner 43 determines the engine stop duration Ts according to expression (2) given below.

$$Ts=1/Kc \cdot (Hd-Hs) \qquad (2)$$

where Ts: Engine stop duration; Kc: Humidity rise coefficient applied if the refrigeration cycle unit A and the blower fan 121 are at rest when the engine 2 is stopped and the blower fan 121 remains at rest after the engine 2 is stopped; Hd: Fogging determination humidity; and Hs: Humidity detected immediately before the engine is stopped.

In STEP20, the engine control unit 44 determines whether the humidity Hs in the vehicle detected by the humidity sensor 30 is lower than the fogging determination humidity Hd estimated by the fogging determination humidity estimator 42. If the detected humidity Hs is lower than the fogging determination humidity Hd, then the engine control unit 44 proceeds to STEP21 wherein the stopping of the engine 2 is enabled. Meanwhile, if the detected humidity Hs is the fogging determination humidity Hd or higher, then the engine control unit 44 branches off to STEP25 to disable the stopping of the engine 2.

If the engine control unit 44 enables the stopping of the engine 2 in STEP21, then the processing proceeds to STEP22 wherein the engine stop duration determiner 43 determines the engine stop duration Ts according to expression (3) given below.

$$Ts=1/Kb \cdot (Hd-Hs) \qquad (3)$$

where Ts: Engine stop duration; Kb: Humidity rise coefficient applied if the refrigeration cycle unit A is at rest while the blower fan 121 is in operation when the engine 2 is stopped, and the blower fan 121 remains in operation after the engine 2 is stopped; Hd: Fogging determination humidity; and Hs: Humidity detected immediately before the engine is stopped.

The humidity rise coefficients Ka to Kc are the coefficients indicating the likelihood of an increase in humidity in the vehicle. When the stopping of the engine is enabled in STEP4, the refrigeration cycle unit 9 and the blower fan 121 are in operation. Hence, the evaporator 12 is cold because it has been cooled, so that even if the engine 2 is stopped and the operation of the compressor 6 is stopped, the effect for dehumidifying the air in the vehicle which circulates via the evaporator 12 is obtained until the temperature of the evaporator 12 rises to a certain level as long as the blower fan 121 is operating.

When the operation of the blower fan 121 is continued after the engine 2 is stopped, the convection of the air in the vehicle makes the window glass more resistant to fogging than when the blower fan 121 is stopped while the engine 2 is at rest.

Therefore, the temperature rise coefficients Ka, Kb, and Kc in the above expressions (1) to (3) are set to values that increase in the order of Ka, Kb and Kc, as indicated by expression (4) given below.

$$Ka<Kb<Kc \qquad (4)$$

In the present embodiment, the humidity rise coefficients Ka, Kb, and Kc have been respectively set on the basis of the following three cases: (a) The engine 2 is stopped while the refrigeration cycle unit A and the blower fan 121 are in operation, and the operation of the blower fan 121 is continued after the engine 2 is stopped; (b) The engine 2 is stopped while the refrigeration cycle unit A is at rest and the blower fan 121 is in operation, and the operation of the blower fan 121 is continued after the engine 2 is stopped; and (c) The engine 2 is stopped while the blower fan 121 is at rest, and the blower fan 121 remains at rest after the engine 2 is stopped. As another embodiment, the humidity rise coefficients may be set by adding more detailed factors, such as the volume of air or the direction of wind of the blower fan 121.

Subsequently, when the engine 2 is in operation, the engine control unit 44 repeatedly executes the processing illustrated by the flowchart in FIG. 3 to determine in STEP51 whether the stop condition of the engine 2 holds. Regarding the stop condition of the engine 2, the stopping of the engine is enabled if, for example, all of the following three conditions are satisfied: (a) there is a sufficient remaining amount of charge of the battery 18 or (b) the air conditioner 1 has accepted the stop condition of the engine 2, or (c) the stopping of the engine has been enabled in any one of STEP4, STEP11 and STEP21 in FIG. 2.

If the stop condition of the engine 2 holds in STEP51, then the engine control unit 44 proceeds to STEP52 and stops the engine 2, or if the stop condition of the engine 2 does not hold, then the engine control unit 44 branches off to STEP58 to terminate the processing.

After the engine 2 is stopped in STEP52, the engine control unit 44 proceeds to STEP53 to start an engine start-up timer which takes the engine stop duration Ts, which is determined in one of STEP5, STEP12, and STEP22 in FIG. 2, as the time to measure. The engine control unit 44 proceeds to STEP55 to restart the engine 2 when a predetermined time has elapsed on the engine start-up timer in the following STEP54.

In the subsequent STEP56, the engine control unit 44 starts up the refrigeration cycle unit A through the intermediary of the air conditioning control unit 45 and starts up the blower fan 121 in STEP57 if the blower fan 121 has been at rest (or continues the operation of the blower fan 121 if the blower fan 121 has already been in operation), and then proceeds to STEP58 to terminate the processing. The refrigeration cycle unit A and the blower fan 121 are started up to start dehumidifying the interior of the vehicle, making it possible to prevent the window glass from fogging up.

The engine stop duration Ts is calculated according to expressions (1) to (3) given above by multiplying the humidity rise coefficient Ka, Kb or Kc, which indicate the likelihood of a rise in the humidity in the vehicle, and the humidity difference between the fogging determination humidity Td under a condition wherein the vehicle is placed and the humidity Ts detected immediately before the engine is stopped (Hd−Hs). Thus, determining the engine stop duration time Hd on the basis of the condition under which the vehicle is placed and the allowance in humidity in the vehicle before the window glass is fogged makes it possible to prevent window glass from fogging and also to reduce fuel consumption by changing the engine stop duration Hd.

The aforesaid embodiment has illustrated an example in which the present invention has been applied to a hybrid vehicle; however, the present invention is applicable also to any idle-stop vehicle provided with an automatic idle-stop feature for automatically stopping and restarting the engine thereof.

What is claimed is:

1. A controller for a vehicle equipped with an engine and a dehumidifier operated from a driving force of the engine to dehumidify the interior of the vehicle, the controller comprising:
    an engine controlling means which stops the engine in the case where a predetermined stop condition holds, and restarts the engine thereafter when a predetermined engine halt duration has elapsed;
    a vehicle condition detecting means which detects a condition under which the vehicle is placed;
    a fogging determination humidity estimating means which estimates a fogging determination humidity, which is a humidity not causing window glass of the vehicle to fog up under the condition detected by the vehicle condition detecting means;
    a humidity detecting means which detects the humidity in the interior of the vehicle; and
    an engine stop duration determining means which determines the engine stop duration on the basis of the humidity difference between the humidity detected by the humidity detecting means immediately before the engine is stopped and the fogging determination humidity, and which determines a longer engine stop duration as the humidity difference increases,
    wherein the engine controlling means restarts the engine and actuates the dehumidifier when the engine stop duration has elapsed following the stop condition being established and the engine stopped.

2. The controller for a vehicle according to claim 1, wherein
    the vehicle comprises a blower fan which supplies air from outside into the vehicle or circulates air in the vehicle, and
    the engine stop duration determining means determines a longer engine stop duration in the case where the blower fan is operating while the engine is at rest than in the case where the blower fan is not operating while the engine is at rest.

3. The controller for a vehicle according to claim 1, wherein
    the dehumidifier has a refrigerant circulation passage, a compressor which is connected to the refrigerant circulation passage and driven by the engine, and an evaporator which is connected to the refrigerant circulation passage and which is provided in a circulation passage of air blown into the vehicle by the blower fan, and which dehumidifies the interior of the vehicle by operating the compressor and the blower fan, and
    the engine stop duration determining means determines a longer engine stop duration in a case where the dehumidifier is dehumidifying the interior of the vehicle at the time the engine stops and the blower fan is in operation while the engine is at rest than in a case where the dehumidifier is not dehumidifying the interior of the vehicle at the time the engine stops and the blower fan is in operation while the engine is at rest.

4. The controller for a vehicle according to claim 1, further comprising:
    an outside air temperature detecting means which detects the temperature outside the vehicle,
    wherein the vehicle condition detecting means detects a condition under which the vehicle is placed on the basis of at least the temperature detected by the outside air temperature detecting means.

* * * * *